United States Patent
Aoki et al.

(10) Patent No.: US 9,336,427 B2
(45) Date of Patent: May 10, 2016

(54) BIOMETRIC INFORMATION IMAGE-CAPTURING DEVICE, BIOMETRIC AUTHENTICATION APPARATUS AND MANUFACTURING METHOD OF BIOMETRIC INFORMATION IMAGE-CAPTURING DEVICE

(71) Applicant: FUJITSU LIMITED, Kawasaki-shi, Kanagawa (JP)

(72) Inventors: Takahiro Aoki, Kawasaki (JP); Yukio Hirai, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 14/096,495

(22) Filed: Dec. 4, 2013

(65) Prior Publication Data

US 2014/0198957 A1    Jul. 17, 2014

(30) Foreign Application Priority Data

Jan. 15, 2013    (JP) ................................. 2013-004830

(51) Int. Cl.
*G06K 9/00* (2006.01)
*G06K 9/20* (2006.01)

(52) U.S. Cl.
CPC ............ *G06K 9/00046* (2013.01); *G06K 9/209* (2013.01); *G06K 9/2027* (2013.01); *Y10T 29/49826* (2015.01)

(58) Field of Classification Search
None
See application file for complete search history.

(56) References Cited

U.S. PATENT DOCUMENTS

| | | |
|---|---|---|
| 6,185,319 B1 * | 2/2001 | Fujiwara ...................... 382/127 |
| 6,414,749 B1 * | 7/2002 | Okamoto et al. ............... 356/71 |
| 2004/0184641 A1 | 9/2004 | Nagasaka et al. |
| 2007/0206098 A1 | 9/2007 | Matsuo et al. |
| 2008/0175444 A1 | 7/2008 | Maro et al. |

FOREIGN PATENT DOCUMENTS

| | | |
|---|---|---|
| CN | 101030245 A | 9/2007 |
| JP | 2002-112970 | 4/2002 |
| JP | 2002-514098 | 5/2002 |
| JP | 2002-200050 | 7/2002 |
| JP | 2004-265269 | 9/2004 |
| JP | 2008-264185 | 11/2008 |
| JP | 2011-215665 | 10/2011 |

(Continued)

OTHER PUBLICATIONS

Korean Office Action dated Aug. 11, 2014 in Korean Patent Application No. 10-2013-0158403.

(Continued)

*Primary Examiner* — Stephen R Koziol
*Assistant Examiner* — Raphael Schwartz
(74) *Attorney, Agent, or Firm* — Staas & Halsey LLP (57) ABSTRACT

A biometric information image-capturing device includes an image capturing unit configured to photograph a body part including biometric information to generate a biometric image in which the biometric information is represented, at least one light source disposed in the periphery of the image capturing unit and configured to illuminate light toward a photographing range of the image capturing unit, and a light guide member disposed to be opposed to the at least one light source in the periphery of the image capturing unit and provided with a concaved portion located at a surface of the light guide member, the concaved portion being nearer to the image capturing unit side than the at least one light source.

17 Claims, 6 Drawing Sheets

(56) References Cited

FOREIGN PATENT DOCUMENTS

| KR | 10-2007-0090725 | 9/2007 |
| WO | 98/08439 | 3/1998 |

OTHER PUBLICATIONS

Chinese Office Action mailed Feb. 3, 2016 in related Chinese Application No. 201310697844.1.

* cited by examiner

BIOMETRIC INFORMATION IMAGE-CAPTURING DEVICE, BIOMETRIC AUTHENTICATION APPARATUS AND MANUFACTURING METHOD OF BIOMETRIC INFORMATION IMAGE-CAPTURING DEVICE

CROSS-REFERENCE TO RELATED APPLICATION

This application is based upon and claims the benefit of priority from the prior Japanese Patent Application No. 2013-004830 filed on Jan. 15, 2013, the entire contents of which are incorporated herein by reference.

FIELD

The present disclosure relates to a biometric information image-capturing device which photographs biometric information and a manufacturing method thereof, and a biometric authentication apparatus.

BACKGROUND

A biometric authentication technology has been developed authenticating a user of an apparatus or a system based on biometric image in which biometric information such as vein pattern of hands or fingers, fingerprints, or palm prints is represented. In the biometric authentication apparatus using such a biometric authentication technology, for example, the biometric information image-capturing device photographs a body part including the biometric information of the user who intends to use the biometric authentication apparatus to acquire a biometric image which represents the biometric information. Also, the biometric authentication apparatus matches the input biometric information of the user represented in the biometric image with the registered biometric information represented in a biometric image of a registered user who is registered in advance. When it is determined that the input biometric information coincides with the registered biometric information based on a matching result, the biometric authentication apparatus authenticates the user as the registered user who has been authorized. Also, the biometric authentication apparatus permits the authenticated user to use an apparatus equipped with the biometric authentication apparatus or another apparatus connected with the biometric authentication apparatus.

There is a biometric information image-capturing device which includes an image capturing unit which photographs the biometric information along with a light source which illuminates the body part including the biometric information in order to have sufficient contrast in the biometric information. Also, the illumination light from the light source is diffusively reflected from the body part including the biometric information and the diffusively reflected light reaches the image capturing unit, so that a luminance distribution according to the biometric information is reproduced on the biometric image. For example, when the biometric information used in the biometric authentication is the vein pattern of hands or fingers, an infrared light emitting diode is used as an illumination light source. The infrared light emitted from the infrared light emitting diode is incident into and repeatedly scatters in hands or fingers to finally become a diffusively reflected light which emits from a skin surface. Some of light rays are absorbed by, for example, the vein in the course of a diffused reflection of light. Also, some of the diffusively reflected light rays reach the image capturing unit. The diffusively reflected light described above diffuses toward various directions and thus, the luminance on the image capturing unit generally becomes lower.

In the meantime, some of the illumination light rays emitted from the illumination light source are specularly reflected on the surface of the body part including the biometric information. Since the specularly reflected light is directed only toward a direction reflected at a reflection angle which is equal to an incidence angle with respect to the normal line of the surface of the body part, the specularly reflected light is brighter than the diffusively reflected light. Therefore, when both the specularly reflected light and the diffusively reflected light are incident on the image capturing unit, an unevenness of luminance occurs between an area on which the specularly reflected light is impinged and another area on which the specularly reflected light is not impinged. Further, in some cases, the specularly reflected light becomes too bright to exceed a dynamic range of the image capturing unit in the area on which the specularly reflected light is impinged and thus, there is a concern that the luminance distribution of the diffusively reflected light representing the biometric information may not be reproduced. Therefore, a technology for removing the specularly reflected light which reaches the image capturing unit has been suggested. See, for example, Japanese Laid-open Patent Publication No. 2002-200050 and Japanese National Publication of International Patent Application No. 2002-514098.

Japanese Laid-open Patent Publication No. 2002-200050 discloses a skin color measurement apparatus in which each of an incident light and a reflected light from a light source is transmitted through a polarization plate, and the reflected light is detected to exclude a surface-reflected light reflected from a surface of skin. The skin color measurement apparatus includes two types of the polarization plates having different polarization directions and switches the polarization plate which transmits light between a case of measuring the surface-reflected light and another case of measuring the diffusively reflected light. Further, Japanese National Publication of International Patent Application No. 2002-514098 discloses a light emitting device including a plurality of light emitting elements that are able to selectively emit light and are positioned such that a regular reflection is excluded or minimized to avoid obtaining a blurred iris image.

SUMMARY

According to an aspect of the invention, a biometric information image-capturing device includes an image capturing unit configured to photograph a body part including biometric information to generate a biometric image in which the biometric information is represented, at least one light source disposed in the periphery of the image capturing unit and configured to illuminate light toward a photographing range of the image capturing unit, and a light guide member disposed to be opposed to the at least one light source in the periphery of the image capturing unit and provided with a concaved portion located at a surface of the light guide member, the concaved portion being nearer to the image capturing unit side than the at least one light source.

An object and advantage of the present disclosure is implemented and achieved by elements particularly indicated in claims and a combination thereof. It is to be understood that both the descriptions described above and the descriptions to be described below are illustrative and explanatory, but not intended to limit the present disclosure as in the claims.

The biometric information image-capturing device disclosed in the present disclosure may reduce unevenness of luminance on the biometric image caused by the specularly reflected illumination light by the surface of the body part including the biometric information.

DESCRIPTION OF EMBODIMENTS

A mechanism for switching the polarization plate between the case of measuring the surface-reflected light and another case of measuring the diffusively reflected light is needed in the technology described in Japanese Laid-open Patent Publication No. 2002-200050. The polarization plate is generally expensive and thus, the biometric information image-capturing device using the polarization plate becomes expensive as well. Moreover, in the technology described in Japanese National Publication of International Patent Application No. 2002-514098, the iris is photographed while individually controlling the light emitting element to be ON and OFF to obtain an image for which a regular reflected light is removed and thus, there is a concern that it will take a time until the image for which the regular reflected light is removed is obtained. Further, a controller which controls the light emitting element is also needed in this technology.

Accordingly, it is preferable to provide a biometric information image-capturing device capable of reducing unevenness of luminance on the biometric image caused by the specularly reflected illumination light by the surface of the body part including the biometric information.

Hereinbelow, a biometric information image-capturing device according to an embodiment will be described with reference to accompanying drawings. The biometric information image-capturing device includes at least one illumination light source located in the periphery of the image capturing unit which photographs the body part including the biometric information and generates an image representing the biometric information, to illuminate a photographing range of the image capturing unit. Also, in the biometric information image-capturing device, a light guide member is provided to be opposed to the illumination light source and a concaved portion or a recess is formed at a surface opposing the illumination light source of the light guide member and thus, light from the illumination light source from the concaved portion is refracted toward the image capturing unit side to make an incidence angle with respect to a surface of the body part including the biometric information larger. Accordingly, the biometric information image-capturing device suppresses the specularly reflected light from the surface of the body part including the biometric information among light rays emitted from the illumination light source from being reached the image capturing unit.

In the present embodiment, it is assumed that the biometric information image-capturing device photographs the vein pattern of a palm to generate an image in which the vein pattern of the palm is represented. However, the biometric information image-capturing device may photograph the biometric information other than the vein pattern of the palm, such as, for example, the vein pattern of hands or fingers, fingerprints, palm prints.

Figure 1:
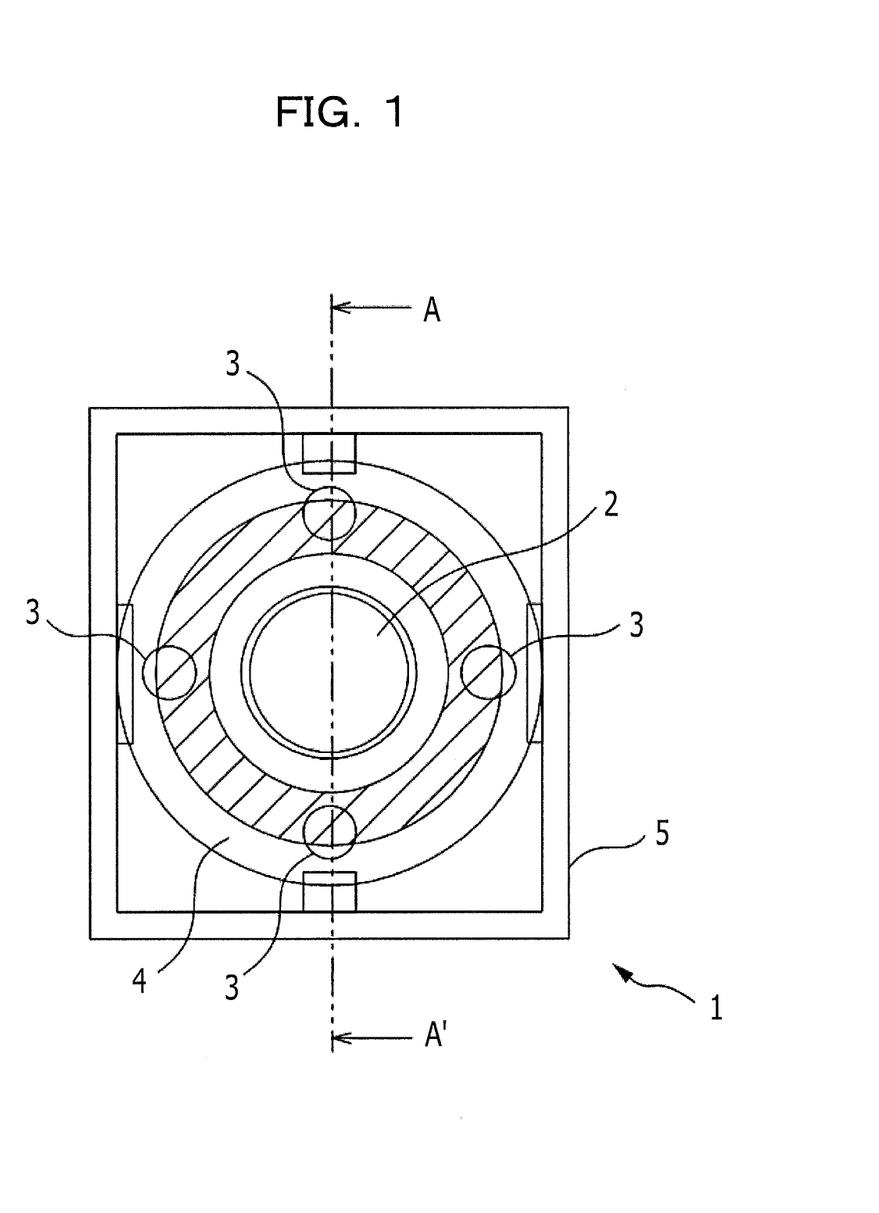
FIG. 1 is a schematic plan view of a biometric information image-capturing device according to an embodiment.
Figure 2:
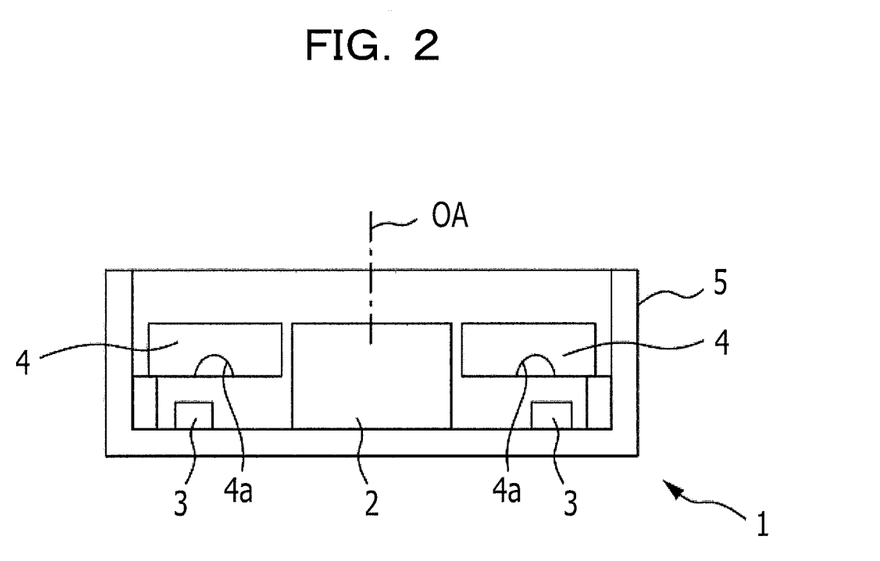
FIG. 2 is a schematic side cross sectional view of the biometric information image-capturing device when viewed from an arrow A-A' of FIG. 1.

FIG. 1 is a schematic plan view of a biometric information image-capturing device according to an embodiment. FIG. 2 is a schematic side cross sectional view of the biometric information image-capturing device when viewed from an arrow A-A' of FIG. 1. As illustrated in FIG. 1 and FIG. 2, the biometric information image-capturing device 1 includes an image capturing unit 2, a plurality of light sources 3, and a light guide member 4. The image capturing unit 2, each of the light sources 3 and the light guide member 4 are accommodated in a rectangular parallelepiped case 5 of which an upper end part is opened. Further, a side wall of the case 5 may be formed in a guide for placing hands. Otherwise, a guide for placing hands may be provided in the periphery of an opening of the case 5 separately from the case 5. Further, a plate shaped transparent glass or transparent plastic for protecting the image capturing unit 2, each light source 3 and the light guide member 4 may be disposed on the upper end of the case 5.

The biometric information image-capturing device 1 illuminates hands placed in the periphery of the opening of the case 5 of an upper side of the biometric information image-capturing device 1 to be opposed to the image capturing unit 2 and each light source 3 with light from each light source 3. Also, the image capturing unit 2 photographs the illuminated hands to generate a biometric image in which the vein pattern of the palm is represented.

The image capturing unit 2 is disposed at lower part of the case 5 such that a sensor surface is oriented upwardly. The image capturing unit 2 includes an area sensor (not illustrated) in which solid-state image-capturing elements having a sensitivity for infrared light are arranged two-dimensionally and an imaging optical system (not illustrated). The imaging optical system images an image within a photographing range on the area sensor such that the entirety of the opening of the upper end of the case 5 becomes the photographing range. When a control signal instructing to photograph is received from a controller (not illustrated) while hands are placed on the periphery of the opening of the upper end of the case 5, the image capturing unit 2 generates the biometric image in which the vein pattern of the palm is represented and outputs the generated biometric image to the controller.

The plurality of the light sources 3 are disposed to be opposed to the light guide member 4 in order to illuminate the photographing range of the image capturing unit 2. In the present embodiment, the biometric information image-capturing device 1 includes four light sources 3 and the respective light sources 3 are disposed at equal intervals on a circumference centered about an optical axis of the image capturing unit 2. Further, each light source 3 may be formed with a light emitting element, for example, an infrared light emitting diode, which emits infrared light such that light from each light source 3 reaches into hands in the present embodiment. Further, each light source 3 may be disposed in such a manner that the light emission surface of the light source is oriented toward a right above to allow the center of the light emission intensity distribution to follow along a perpendicular direction, otherwise, the light emission surface of the light source orients upward obliquely to allow the center of the light emission intensity distribution to be inclined nearer to the image capturing unit 2 side than the perpendicular direction. Further, the number of the light sources 3 is not limited to four light sources, but may be, for example, three, six or eight light sources. Further, in a case where a light emitting element having sufficient light emission intensity may be used as the light source, the number of the light source 3 may be 1 (one). In the present embodiment, each of the light sources 3 is always lighted ON during photographing of the vein pattern of the palm.

The light guide member 4 is made of materials, such as acrylic resin or glass, which is transparent to light emitted from the light source 3, and has a ring shape. Further, in the present embodiment, a lower surface and an upper surface of the light guide member 4 is orthogonal to an optical axis OA of the image capturing unit 2, respectively. Also, the light guide members 4 are disposed on the upper side of each light source 3 to be opposed to each light source 3 such that the center of the light guide member 4 is substantially coincided with the optical axis OA of the image capturing unit 2, and thus, the light guide member 4 is fixed on a protrusion provided on, for example, a sidewall of the case 5 by adhesion. Therefore, the light emitted from the light source 3 transmits the light guide member 4 and then, incidents on hands placed on the upper side of the biometric information image-capturing device 1.

In the present embodiment, the concaved portion 4a which becomes a concaved shape with respect to the light source 3 is formed on the lower surface of the light guide member 4, that is, a side surface opposing the light source 3. Accordingly, the concaved portion 4a includes a concave surface as illustrated in FIG. 2. The concaved portion 4a may be formed in a ring shape centered about the optical axis OA of the image capturing unit 2, or otherwise, a cross section along a radial direction from the optical axis OA of the image capturing unit 2 may be formed in an arc, parabola or other secondary or higher-order curve. Otherwise, the concaved portion 4a may be formed in a spherical surface shape or aspherical shape such as a paraboloidal surface only at locations opposing the light source 3.

The concaved portion 4a is formed in such a manner that the center of the concaved portion 4a is formed nearer to the image capturing unit 2 side than the center of the light emission surface of the light source 3 along a line connecting the optical axis of the image capturing unit 2 and the light source 3. Accordingly, light emitted from the light source 3 becomes wider by the concaved portion 4a and also a portion of the emitted light is refracted by the concaved portion 4a such that an angle of the light with respect to the perpendicular direction becomes larger. Therefore, the refracted light is obliquely incident onto the surface of hands at a large incidence angle. In the specular reflection, an incidence angle is equal to a reflection angle and thus, the light specularly reflected from the surface of hands is also reflected at a larger reflection angle. As a result, the specularly reflected light does not reach the image capturing unit 2 and only the light diffusively reflected on the surface of hands or within the hands reaches the image capturing unit 2.

Figure 3:
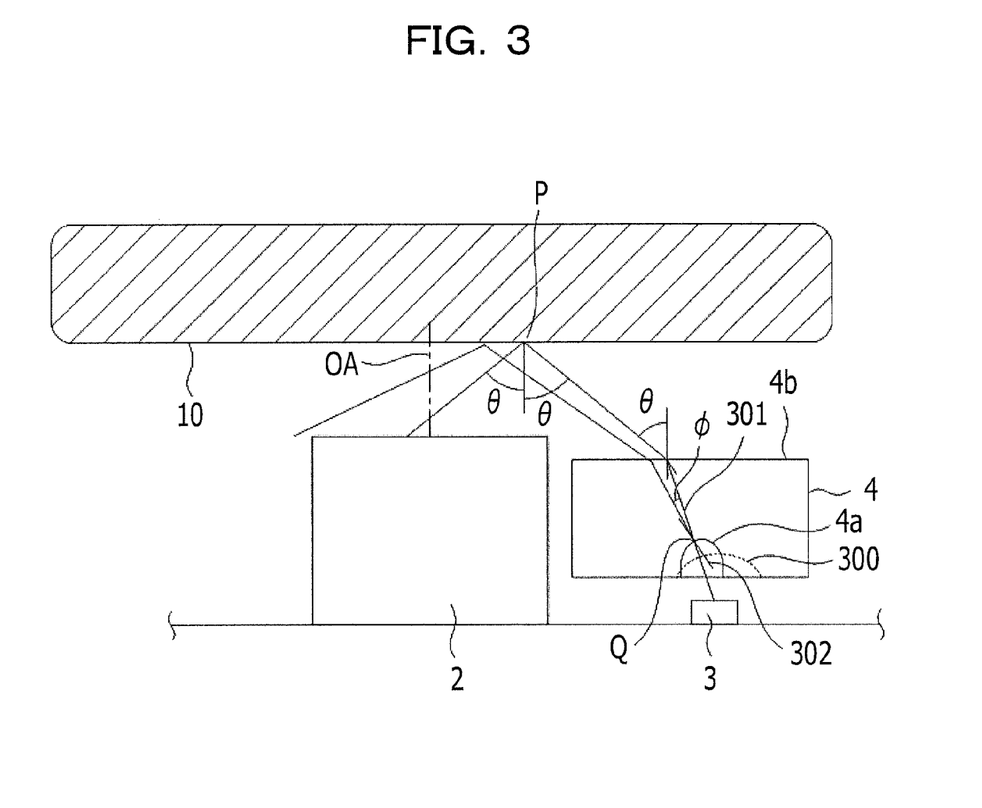
FIG. 3 is a view illustrating an example of a positional relationship between a light source, a subject and an image capturing unit.

This situation will be described in more detail with reference to FIG. 3. In the present embodiment, it is assumed that the body part 10 including the biometric information covers the entirety of the opening formed at the upper end of the case 5 while being mounted on the upper side of the biometric information image-capturing device 1. Further, for simplicity, it is assumed that the optical axis OA of the image capturing unit 2 is parallel to a perpendicular direction, and also, the surface of the body part 10 including the biometric information is perpendicular to the optical axis OA of the image capturing unit 2.

In the specular reflection, since the incidence angle is equal to the reflection angle, the light emitted from the light source 3 is reflected from a point P between the light source 3 and the image capturing unit 2 on a line intersecting a perpendicular surface connecting the light source 3 and the image capturing unit 2, and the surface of the body part 10, in order for the light to specularly reflect from the surface of the body part 10 and to be incident on the image capturing unit 2. It is assumed that the incidence angle and the reflection angle for the case described above is θ. Further, the light emitted from the light source 3 is refracted on the upper surface 4b of the light guide member 4. Therefore, the light is emitted from the light guide member 4 at an angle of θ in order to be incident on the surface of the body part 10 at the incidence angle θ. Accordingly, according to the Snell's law, the light emitted from the light source 3 is incident on the upper surface 4b of the light guide member 4 at an angle of φ (=arc sin (sin θ/n)) with respect to the normal line, where "n" is refractive index of the light guide member 4.

Here, it is assumed that the concaved portion 4a is formed as in the shape of the curved surface 300 indicated by a dotted line. As illustrated by an arrow 301, when the light emitted from the light source 3 is incident on the curved surface 300 parallel to the normal line of the curved surface 300 indicated by the dotted line and further, maintains an angle of φ with respect to the perpendicular direction, the light emitted from the light source 3 travels straightforward without being refracted from the curved surface 300. Therefore, the light is specularly reflected from the body part 10 and incidents onto the image capturing unit 2. For convenience, light ray indicated by the arrow 301 is referred to as the specularly reflected light.

Accordingly, in the present embodiment, a position and a curvature of the concaved portion 4a is set such that a normal line 302 at an intersection point Q of the specularly reflected light and the surface of the concaved portion 4a is more separated from the image capturing unit 2 than the specularly reflected light at an outside of the concaved portion 4a. Accordingly, the light emitted from the light source 3 and incident onto the intersection point Q is refracted from the intersection point Q toward the image capturing unit 2 and thus, an incidence angle of the light to the body part 10 becomes larger than the angle of θ and further, the light reaches the body part 10 at a position nearer to a perpendicular upper side of the image capturing unit 2 than the point P. Therefore, the specularly reflected light is not incident on the image capturing unit 2.

As described above, the biometric information image-capturing device may refract the light emitted from the light source towards the image capturing unit side by the concaved portion provided on the light guide member positioned between the light source and the body part including the biometric information to suppress the specularly reflected light from being reached the image capturing unit. Therefore, the biometric information image-capturing device may reduce unevenness of luminance on the biometric image caused by the specularly reflected light. Further, the biometric information image-capturing device does not need a mechanically operating component in order to suppress the specularly reflected light from being reached the image capturing unit. Therefore, the biometric information image-capturing device may be miniaturized. Further, the biometric information image-capturing device does not need a lighting control of the light source and the light source may be always lighted on during photographing and thus, control of the biometric information image-capturing device may be simplified.

Further, according to a modified example, the light guide member may include a diffusion layer which diffuses light refracted from the concaved portion.

Figure 4:
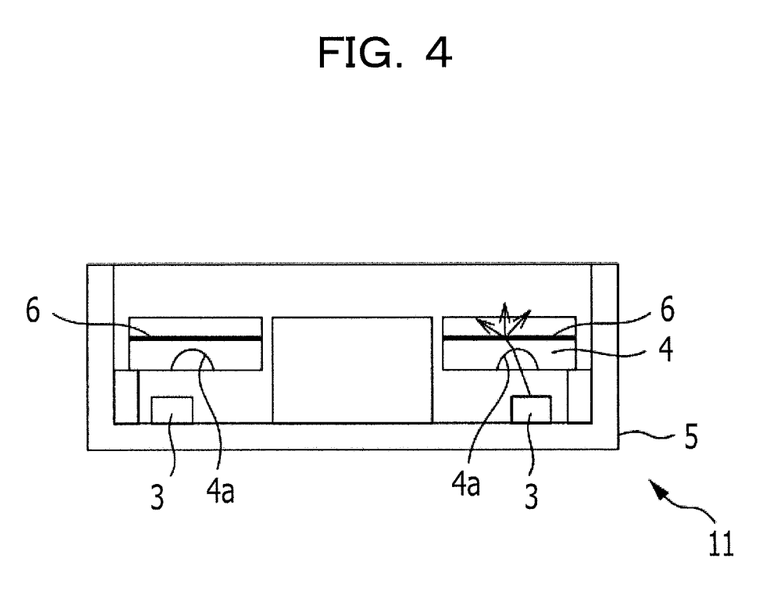
FIG. 4 is a schematic side cross sectional view of the biometric information image-capturing device according to a modified example.

FIG. 4 is a schematic side cross sectional view of the biometric information image-capturing device according to a modified example. In FIG. 4, the respective components of a biometric information image-capturing device 11 according to the modified example are given the same reference numerals as those of the corresponding constitutional elements of the biometric information image-capturing device 1 illustrated in FIG. 1 and FIG. 2. In the biometric information image-capturing device 11 according to the modified example, a diffusion layer 6 is provided substantially parallel to a bottom surface of the case 5 within the light guide member 4. The diffusion layer 6 forms, for example, the light guide member 4 with an upper side member and a lower side member and is formed by making a boundary surface between the upper side member and the lower side member a rough surface. Otherwise, a light diffusion film or a light diffusion sheet may be disposed between the upper side member and the lower side member of the light guide member 4 as the diffusion layer 6. Further, the diffusion layer 6 may be formed on the upper surface of the light guide member 4.

Accordingly, the light from the light source 3 is widened by the concaved portion 4a and then, further scattered at the diffusion layer 6. Therefore, the body part including the biometric information placed on the uppers side of the biometric information image-capturing device 11 is illuminated with light rays incoming from various directions. Therefore, the biometric information image-capturing device 11 may further suppress unevenness of luminance of light illuminated to the body part including the biometric information and as a result, unevenness of luminance on the biometric image may be reduced.

Figure 5:
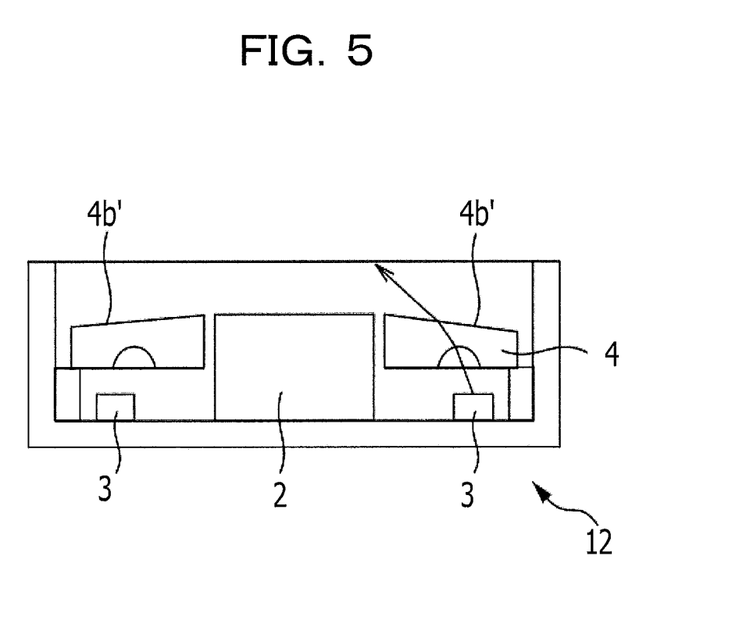
FIG. 5 is a schematic side cross sectional view of the biometric information image-capturing device according to another modified example.

FIG. 5 is a schematic side cross sectional view of the biometric information image-capturing device according to another modified example. In FIG. 5, the respective components of a biometric information image-capturing device 12 according to the modified example are given to the same reference numerals as those of the corresponding constitutional elements of the biometric information image-capturing device 1 illustrated in FIG. 1 and FIG. 2.

In the modified example, the upper surface 4b' of the light guide member 4 is formed in a tapered shape such that the light guide member 4 becomes gradually thicker as the light guide member 4 approaches the center, that is, the image capturing unit 2. Therefore, an angle of the light from the light source 3 incident upon the upper surface 4b' becomes larger as compared to a case where the upper surface 4b is orthogonal to the optical axis of the image capturing unit 2. Accordingly, the light is refracted by the upper surface 4b' toward a direction inclined more to the image capturing unit 2 side and thus, an incidence angle of the light incident upon the body part including the biometric information and placed on the upper side of the biometric information image-capturing device 12 also becomes larger. Accordingly, the biometric information image-capturing device 12 may suppress the specularly reflected light on the surface of the body part from being reached the image capturing unit 2.

According to another modified example, a concaved portion may be formed on the upper surface of the light guide member opposing the body part including the biometric information along with another concaved portion formed on a lower surface of the light guide member opposing the light source or instead of the concaved portion formed on the lower surface. In this case, the concaved portion formed on the upper surface is desirable to be formed in the periphery of the image capturing unit than the light source along a line connecting the optical axis of the image capturing unit and the light source. Accordingly, the concaved portion formed on the upper surface may widen the light from the light source.

Figure 6:
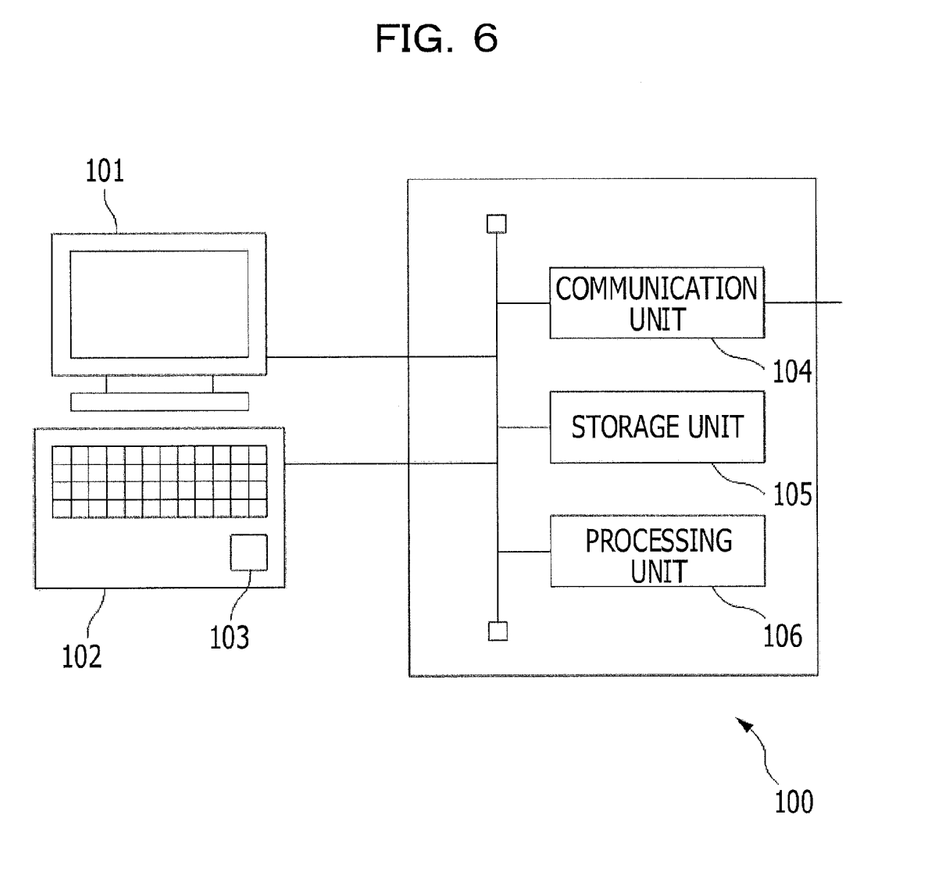
FIG. 6 is a view schematically illustrating a configuration of a biometric authentication apparatus including the biometric information image-capturing device.

FIG. 6 is a view schematically illustrating a configuration of a biometric authentication apparatus including the biometric information image-capturing device according to the embodiment described above or the modified example thereof. As illustrated in FIG. 6, the biometric authentication apparatus 100 includes a display unit 101, an input unit 102, a biometric information image-capturing device 103, a communication unit 104, a storage unit 105, and a processing unit 106. The display unit 101, the input unit 102 and the biometric information image-capturing device 103 may be provided separately from a case in which the communication unit 104, the storage unit 105 and the processing unit 106 are accommodated. Otherwise, the display unit 101, the input unit 102, the biometric information image-capturing device 103, the communication unit 104, the storage unit 105 and the processing unit 106 may be in a single case, such as, so called a notebook type personal computer or a tablet type terminal. Further, the biometric authentication apparatus 100 may further include a storage medium access apparatus (not illustrated) which accesses a storage medium such as a magnetic disk, a semiconductor memory card and an optical storage medium. Also, the biometric authentication apparatus 100 may read a computer program for a biometric authentication process stored on the storage medium to be executed on the processing unit 106 through, for example, the storage medium access apparatus, and execute the biometric authentication process according to the computer program.

The biometric authentication apparatus 100 executes the biometric authentication process using the biometric image indicating the vein pattern of the palm, which is generated by the biometric information image-capturing device 103, of a user Also, when it is authenticated that a user is one of registered users as a result of the biometric authentication process, the biometric authentication apparatus 100 permits the user to use a computer equipped with the biometric authentication apparatus 100. Otherwise, the biometric authentication apparatus 100 transmits a signal that the user is authenticated to another device not illustrated through the communication unit 104 to permit the user to use the other device.

The display unit 101 includes a display device, for example, a liquid crystal display. Also, the display unit 101 displays, for example, a message indicating the body part (right hand or left hand) used for matching, or a guidance message for placing hands on a position at which an appropriate biometric image may be obtained, with respect to the user. Further, the display unit 101 displays various information related to an application executed by the processing unit 106.

The input unit 102 includes a pointing device, for example, a keyboard and a mouse. Also, a command, data, a user name or a user identification number input by the user through the input unit 102 is transferred to the processing unit 106.

The biometric information image-capturing device 103 is a biometric information image-capturing device according to the embodiment described above or the modified example thereof and generates the biometric image indicating the vein pattern of the palm of the user. The biometric information image-capturing device 103 transmits the biometric image to the processing unit 106 each time when the biometric image is generated.

The communication unit 104 includes a communication interface circuit used for connecting the biometric authentication apparatus 100 to a communication network (not illustrated). Also, the communication unit 104 transmits the permission for use or the authentication result with respect to the user received from the processing unit 106 to another device through the communication network.

The storage unit 105 includes, for example, a non-volatile semiconductor memory and a volatile semiconductor memory. Also, the storage unit 105 stores, for example, an application program used in the biometric authentication apparatus 100, user names, user identification numbers and individual setting information of at least one of registered users. Further, the storage unit 105 stores a program for executing the biometric authentication process. Further, the storage unit 105 stores data for matching that indicates the feature of the vein pattern of the left or right palm which is the registered biometric information of the registered users. The data for matching include a position or a type of a feature point which indicates a characteristic structure such as an end point or a bifurcation point of the vein extracted from the biometric image generated at the time of registration of the registered user or update of the data for matching. Otherwise, the data for matching may be data itself generated at the time of registration of the registered user or at the time of update of the data for matching, or a portion of the biometric image.

The processing unit 106 includes a single or plural processors and peripheral circuits thereof. Also, the processing unit 106 executes the biometric authentication process using the biometric image in which the biometric information of the user is represented obtained from the biometric information image-capturing device 103.

The processing unit 106 generates the data for matching indicating features of the biometric information photographed in the biometric image from the biometric image. For example, when the biometric authentication apparatus 100 performs a matching process with a minutiae matching, the processing unit 106 extracts the feature points used in the minutiae matching from the biometric image. Also, the processing unit 106 uses locations of the feature points and the types of the feature points as the data for matching.

Therefore, the processing unit 106 distinguishes a vein area which is a set of pixels in which the vein is photographed from a non-vein area which is another set of pixels in which the vein is not photographed. The value of the pixel in which the vein is photographed is lower than that of the pixel in which the vein is not photographed in the present embodiment. Accordingly, the processing unit 106 binarizes the biometric image such that, for example, a set of pixels having a pixel value which is equal to or less than a binarization threshold value is set as a vein area and another set of pixels having another pixel value which is larger than the binarization threshold value is set as a non-vein area. The binarization threshold value is set to, for example, a preset fixed value (e.g., 150) or an average pixel value of the respective pixels within the biometric image.

Next, the processing unit 106 performs, for example, a thinning process with respect to the set of pixels having pixel values which correspond to the vein on the binarized biometric image to generate a thinned binary image in which the vein is thinned. The processing unit 106 scans the thinned binary image using a plurality of templates that correspond to the bifurcation points or the end points of the vein to detect locations of the bifurcation points or the end points on the thinned binary image when the thinned binary image matches with any one of templates. The processing unit 106 extracts a central pixel at the detected location or the detected locations as a feature point.

Further, the processing unit 106 may extract the feature point from the biometric image using another known method which obtains the endpoints and the bifurcation points as the feature points. Further, the processing unit 106 may obtain another feature amount indicating the feature of the vein pattern on the biometric image as the data for matching. For example, the processing unit 106 may divide a subject area into a plurality of blocks and obtain the number of veins for each block as the data for matching.

Further, when the biometric authentication apparatus 100 performs the matching process with a pattern matching, the processing unit 106 may extract the biometric image itself or some area including the vein area on the biometric image from the biometric image to define the biometric image itself or some area as the data for matching.

In the meantime, the processing unit 106 receives the user name or the user identification number from the input unit 102, and the processing unit 106 reads the data for matching of the registered user corresponding to the user name or the user identification number from the storage unit 105. Next, the processing unit 106 matches the data for matching of the user with that of the registered user and calculates a matching score indicating a similarity level between two data for matching to be matched as the result of the matching process.

When the minutiae matching is used, the processing unit 106 obtains the number of feature points that match with the feature points included in the data for matching of the registered user and the feature points included in the data for matching of the user with respect to the vein pattern. Next, the processing unit 106 divides the number of the matched feature points by the number of the feature points extracted with respect to the vein pattern of the user to calculate the matching score. Further, when the pattern matching is used, the processing unit 106 calculates a normalized cross-correlation value while changing a relative position of the biometric image and the biometric image in which the vein pattern of the registered user is photographed. Also, the processing unit 106 defines the maximum value of the normalized cross-correlation value as the matching score.

When the matching score is equal to or larger than a threshold value for determining authentication, the processing unit 106 determines that the biometric information of the user is matched with the biometric information of the registered user to be matched, and the processing unit 106 authenticates the user as the registered user.

When the matching score is less than the threshold value for determining authentication, the processing unit 106 determines that the biometric information of the user is not matched with the biometric information of the registered user to be matched. In this case, the processing unit 106 does not authenticate the user and displays the authentication result information indicating an authentication result on the display unit.

The threshold value for determining authentication may be set to a value with which the authentication by the processing unit 106 succeeds only when the registered user is the user himself. Also, the threshold value for determining authentication may be set to another value with which the authentication by the processing unit 106 fails when a person different from the registered user is a user. For example, the threshold value for determining authentication may be set to a value obtained by adding a value obtained by multiplying a difference between the maximum value and the minimum value of the matching score by 0.7 to the minimum of the score value.

In the present embodiment, an area on which the specularly reflected light by the body part including the biometric information is impinged is absent on the biometric image and thus, unevenness of luminance on the biometric image is small. Accordingly the biometric information is clearly represented on the biometric image and the biometric authentication apparatus according to the present embodiment may use most of the feature points of the biometric information for matching. Therefore, the biometric authentication apparatus of the present embodiment may enhance the authentication accuracy.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. A biometric information image-capturing device comprising:
    an image capturing unit configured to photograph a body part including biometric information to generate a biometric image in which the biometric information is represented;
    at least one light source disposed at the periphery of the image capturing unit and configured to illuminate light toward a photographing range of the image capturing unit; and
    a light guide member disposed to be opposed to the at least one light source at the periphery of the image capturing unit and provided with a concaved portion located at a surface of the light guide member, the concaved portion being nearer to the image capturing unit side than the at least one light source, the light guide member being disposed such that specular reflection does not reach the image capturing unit.

2. The biometric information image-capturing device according to claim 1, wherein the concaved portion is formed on a surface of the light guide member side opposing the at least one light source.

3. The biometric information image-capturing device according to claim 1, wherein the concaved portion is formed on one of surfaces of the light guide member side opposing the at least one light source and the other of surfaces of the light guide member is disposed so as to oppose the body part.

4. The biometric information image-capturing device according to claim 2, wherein the concaved portion is formed in such a manner that a normal line of the surface of the concaved portion at an intersection point of the light ray and the concaved portion is inclined to be further separated from the image capturing unit than a direction of a predetermined light ray among light rays emitted from the at least one light source incident onto the concaved portion, in order for the predetermined light ray to be specularly reflected from a surface of the body part placed on a predetermined location to be incident upon the image capturing unit.

5. The biometric information image-capturing device according to claim 2, wherein the light guide member includes a diffusion layer that diffuses light refracted by the concaved portion.

6. The biometric information image-capturing device according to claim 2, wherein the light guide member is formed such that a thickness of the light guide member along the optical axis direction of the image capturing unit becomes thicker as the light guide member approaches the image capturing unit.

7. A biometric authentication apparatus comprising:
    a storage configured to store registered data indicating features of biometric information of a registered user;
    a biometric information image-capturing device configured to generate a biometric image in which the biometric information of a user is represented, the biometric information image capturing device comprising:
        an image capturing unit configured to photograph a body part including biometric information to generate a biometric image in which the biometric information is represented;
        at least one light source disposed at the periphery of the image capturing unit and configured to illuminate light toward a photographing range of the image capturing unit; and
        a light guide member disposed to be opposed to the at least one light source at the periphery of the image capturing unit and provided with a concaved portion located at a surface of the light guide member, the concaved portion being nearer to the image capturing unit side than the at least one light source, the light guide member being disposed such that specular reflection does not reach the image capturing unit; and
    a processor configured to generate user data corresponding to the biometric image and to match the user data with the registered data to determine whether the user is to be authenticated as the registered user.

8. A manufacturing method of a biometric information image-capturing device comprising:
    disposing an image capturing unit configured to photograph a body part including biometric information to generate a biometric image in which the biometric information is represented;
    disposing at least one light source illuminating light toward a photographing range of the image capturing unit at the periphery of the image capturing unit; and
    disposing a light guide member including a concaved portion on the surface thereof at the periphery of the image capturing unit such that the light guide member is opposed to the at least one light source, and the concaved portion is located at a surface nearer to the image capturing unit side than the at least one light source, the light guide member being disposed such that specular reflection does not reach the image capturing unit.

9. The biometric information image-capturing device according to claim 1, wherein
    the at least one light source is disposed at a side of the image capturing unit,
    the light guide member is disposed to be opposed to the at least one light source and at the side of the image capturing unit, and
    the concaved portion is nearer to the side of the image capturing unit than the at least one light source.

10. The biometric information image-capturing device according to claim 9, wherein the center of the concaved portion is nearer to the side of the image capturing unit than the center of the at least one light source.

11. The biometric authentication apparatus according to claim 7, wherein the concaved portion is formed on a surface of the light guide member side opposing the at least one light source.

12. The biometric authentication apparatus according to claim 7, wherein the concaved portion is formed on one of surfaces of the light guide member side opposing the at least one light source and the other of surfaces of the light guide member is disposed so as to oppose the body part.

13. The biometric authentication apparatus according to claim 12, wherein the concaved portion is formed in such a manner that a normal line of the surface of the concaved portion at an intersection point of the light ray and the concaved portion is inclined to be further separated from the image capturing unit than a direction of a predetermined light ray among light rays emitted from the at least one light source incident onto the concaved portion, in order for the predetermined light ray to be specularly reflected from a surface of the body part placed on a predetermined location to be incident upon the image capturing unit.

14. The biometric authentication apparatus according to claim 11, wherein the light guide member includes a diffusion layer that diffuses light refracted by the concaved portion.

15. The biometric authentication apparatus according to claim 11, wherein the light guide member is formed such that a thickness of the light guide member along the optical axis direction of the image capturing unit becomes thicker as the light guide member approaches the image capturing unit.

16. The biometric authentication apparatus according to claim 7, wherein
the at least one light source is disposed at a side of the image capturing unit,
the light guide member is disposed to be opposed to the at least one light source and at the side of the image capturing unit, and
the concaved portion is nearer to the side of the image capturing unit than the at least one light source.

17. The biometric authentication apparatus according to claim 16, wherein the center of the concaved portion is nearer to the side of the image capturing unit than the center of the at least one light source.

* * * * *